(12) United States Patent
Newman

(10) Patent No.: US 6,781,253 B2
(45) Date of Patent: Aug. 24, 2004

(54) CONVERTING OCEAN ENERGY INTO ELECTRICAL ENERGY USING BOURDON TUBES AND CARTESIAN DIVERS

(76) Inventor: Edwin Newman, 10331 Lindley Ave. #113, Northridge, CA (US) 91326

( * ) Notice: Subject to any disclaimer, the term of this patent is extended or adjusted under 35 U.S.C. 154(b) by 0 days.

(21) Appl. No.: 10/263,451

(22) Filed: Oct. 3, 2002

(65) Prior Publication Data

US 2003/0184096 A1 Oct. 2, 2003

Related U.S. Application Data

(63) Continuation-in-part of application No. 10/105,595, filed on Mar. 26, 2002, now abandoned.

(51) Int. Cl.$^7$ .............................................. F03B 13/12
(52) U.S. Cl. .............................. 290/53; 290/42; 405/76
(58) Field of Search ........................ 290/53, 42; 60/398; 405/76

(56) References Cited

U.S. PATENT DOCUMENTS

| | | | | |
|---|---|---|---|---|
| 2,242,598 A | * | 5/1941 | Quinte ........................ | 60/716 |
| 2,850,370 A | | 9/1958 | Martin ......................... | 60/23 |
| 3,651,697 A | * | 3/1972 | Ianuzzi ........................ | 73/714 |
| 3,742,233 A | * | 6/1973 | Gorgens et al. ........ | 250/231.14 |
| 4,222,238 A | * | 9/1980 | McCulloch .................. | 60/398 |
| 4,288,985 A | * | 9/1981 | Dyck ........................... | 60/398 |
| 4,883,411 A | * | 11/1989 | Windle ........................ | 417/331 |
| 5,105,094 A | * | 4/1992 | Parker ........................ | 290/53 |
| 5,324,988 A | | 6/1994 | Newman ...................... | 290/54 |
| 6,450,732 B1 | * | 9/2002 | Boccotti ...................... | 405/76 |
| 6,476,512 B1 | * | 11/2002 | Rutta .......................... | 290/42 |

FOREIGN PATENT DOCUMENTS

JP           362284970 A   * 12/1987

* cited by examiner

Primary Examiner—Joseph Waks

(57) ABSTRACT

A system for converting the kinetic energy of the ocean into electrical energy. There is presented a water-filled pipe extending from the shore into the ocean. The sunken end opens into a water-filled piston sleeve standing upright on the ocean floor. The sleeve contains a buoyant piston extending either to the ocean surface or into an internal wave field. Since the end of the pipe located ashore ends into either a Bourdon Tube or Cartesian Diver then passing waves or tide action will vary the pressure of the water in the Bourdon Tube or Cartesian Diver. Machinery is presented that can convert the elastic potential energy of a Bourdon Tube and Cartesian Diver into kinetic energy to operate an electric generator. There is no complicated and expensive electrical machinery offshore, there is no significant movement of mechanical or hydraulic parts offshore and there are no significant friction losses in bringing the energy ashore.

6 Claims, 4 Drawing Sheets

CONVERTING OCEAN ENERGY INTO ELECTRICAL ENERGY USING BOURDON TUBES AND CARTESIAN DIVERS

Prior application Ser. No. 10/105,595 filed Mar. 26, 2002, abandoned. This application is a continuation-in-part.

Reference is also made to my Disclosure Document #515689.

BACKGROUND OF THE INVENTION

1. Field of the Invention

This invention relates to devices for generating electricity from various motions of the oceans, particularly surface waves, internal waves and tides.

2. The Basic Physics of the Invention

This can be illustrated with a liquid barometer but also a pipe may be laid so one end is sunk to the bottom offshore and the other end is laid down ashore. The sunken end is open and the end ashore is closed. The whole pipe is filled with water and assuming the end ashore is not 34 ft. above the waterline the water will not drain out since air pressure on the ocean surface will support a maximum 34 ft. water column. If then the water column above the sunken pipe end is made to vary by the passage of surface waves for example, the pressure of the water within the pipe ashore is also made to vary. As stated the pipe end ashore is closed so if the pipe wall ashore is made flexible it will expand and contract depending on the pressure fluctuations in the pipe. The flexible wall may be formed as a Bourdon Tube or a Cartesian Diver. Thus the changing potential energy as expressed as pressure energy of the working fluid within the pipe and the elastic energy of part of the pipe wall may be converted into kinetic energy and then into electrical energy.

SUMMARY OF THE INVENTION

The basic idea of the invention may be applied to extract the energy of surface waves as well as internal waves. There are two preferred embodiments.

1. The Pipe is Extended Far Offshore with a Bourdon Tube Used Ashore.

The offshore end of the pipe ends within a large neutrally buoyant closed cylinder mounted within a sleeve so as internal waves impact the cylinder it tends to rise and fall. The cylinder is configured to act as a piston, alternately compressing and decompressing the water in the pipe and operating a Bourdon tube and connected generator ashore. A Cartesian Diver may be used instead of a Bourdon Tube.

2. As in Preferred Embodiment 1

But the cylinder is configured to ride surface waves instead of internal waves so the cylinder top lies slightly awash.

Accordingly it is a principle object of the invention to eliminate the need for complicated and expensive electrical equipment offshore.

Another object of the invention is to eliminate all significant movement from offshore structures. Regardless of the amount of energy transferred ashore the moveable parts of the offshore structure of the invention will have no substantial movement.

The third object of the invention is that as energy is transferred ashore through the pipe there is substantially no movement of the water through the pipe and no consequent friction loss.

Further objects of the invention will become apparent from the study of the following portion of the specification, the claims and the attached drawings.

DESCRIPTION OF THE PROFFERED EMBODIMENTS

First Preferred Embodiment.

Figure 2:
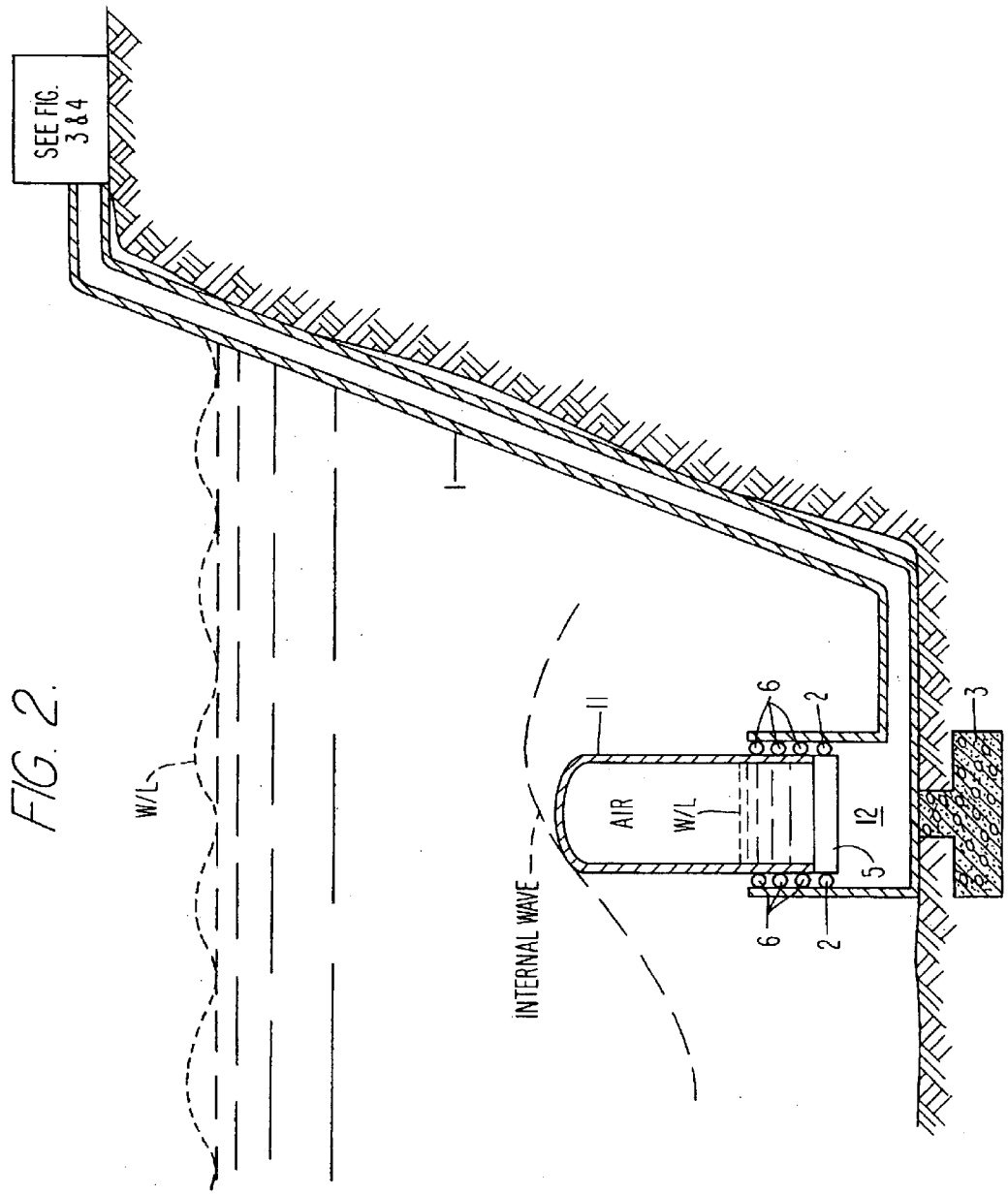
FIG. 2 is a perspective view showing how energy in the pipe may be converted into electrical energy using a Cartesian Diver.

We turn to FIG. 2. Here we see pipe 1 extended to an offshore submerged structure. There is shown a base 13 firmly fixed to the ocean floor. Mounted on base 13 is piston sleeve 12. Closed cylinder 11 contains enough of an air bubble to make it neutrally buoyant where the water density is average for the selected location where the device is installed. Ball bearings 6 are attached to piston sleeve 12 and are made to be rolled on the vertical surface of cylinder 11. The bottom surface of cylinder 11 is configured as piston 5 with an O-ring 2 around its rim.

In operation passing internal waves cause the seawater surrounding cylinder 11 to fluctuate in density. This causes cylinder 11 to rise or fall. Increasing density of the seawater causes cylinder 11 to tend to fall. But since piston sleeve 12 is full of water then the water in pipe 1 and in Bourdon Tube 15 will compress. Bourdon Tube 15 will then flex and operate induction generator 23. Contrarily, decreasing density of seawater surrounding cylinder 11 causes the cylinder to tend to rise, reducing the pressure in pipe 1 and Bourdon Tube 15 to near zero absolute. This also causes induction generator 23 to be operated.

Figure 3:
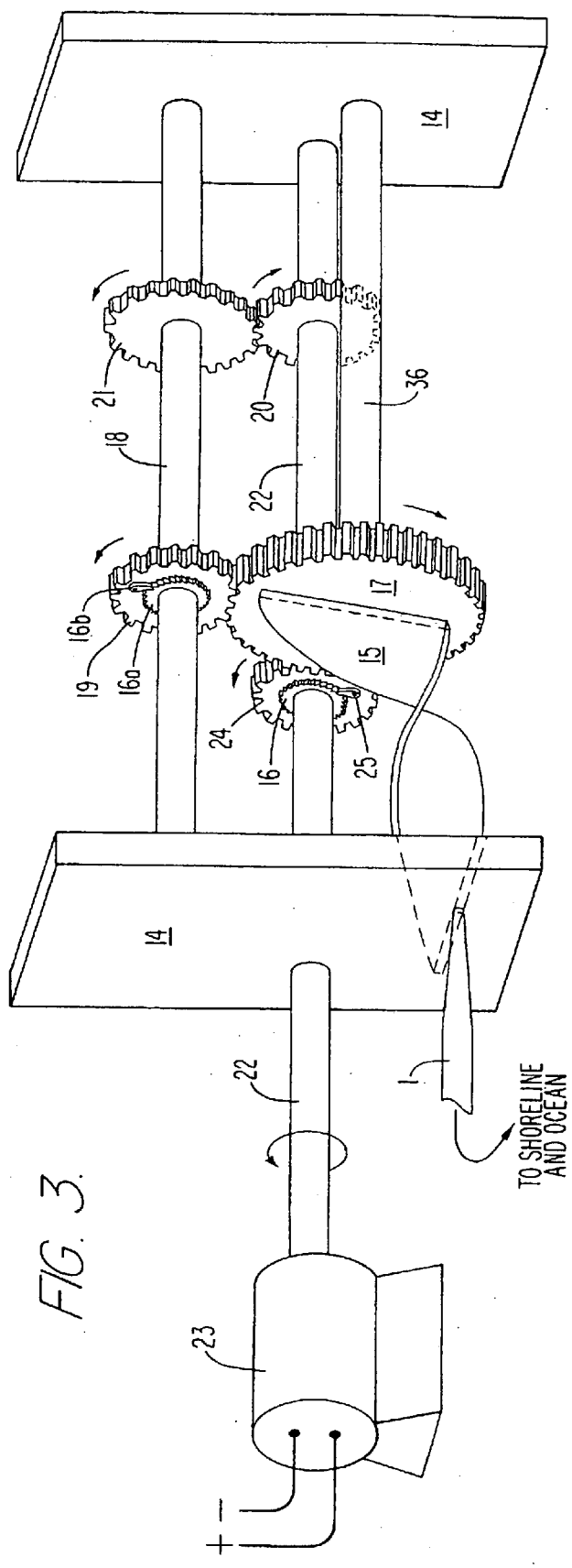
FIG. 3 is a side cross-sectional view of an offshore structure configured to convert the energy of internal waves of the ocean into fluctuating amounts of force according to the invention.

In FIG. 3 we see the shore end of pipe 1 made to open into the fixed end of Bourdon Tube 15. The moveable end of Bourdon Tube 15 is fixed to spur gear 17 axially mounted on shaft 16 and supported by supports 14. Meshing with gear 17 is gear 24 mounted on driveshaft 22. Pawl 25 is operatively attached to gear 24. Ratchet 16 is fixed to shaft 22. Supports 14 also support shaft 18. Gear 19 with operatively attached pawl 16b is mounted on shaft 18. Ratchet 16a is fixedly attached to shaft 18. Ratchet 16a and pawl 16b are set to be made to operate in the opposite direction from ratchet 16 and pawl 25 operatively attached to gear 17. Axially attached to driveshaft 22 is gear 20 which is located to mesh with gear 21 which is axially attached to shaft 18. In operation Bourdon Tube 15 is filled with seawater. As waves move towards the shoreline pressure in pipe 1 is made to vary since the water column over the sunken end of pipe 1 varies in height. Consequently Bourdon Tube 15 is made to flex and relax, rotating gear 17 back and forth. Due to the aforementioned system of gears 17,20,21,24 and ratchets 16,16a and pawls 16b, 25 driveshaft 22 is made to rotate in only one direction regardless of the direction gear 17 is made to rotate. Driveshaft 22 thus is made to operate induction generator 23.

Figure 4:
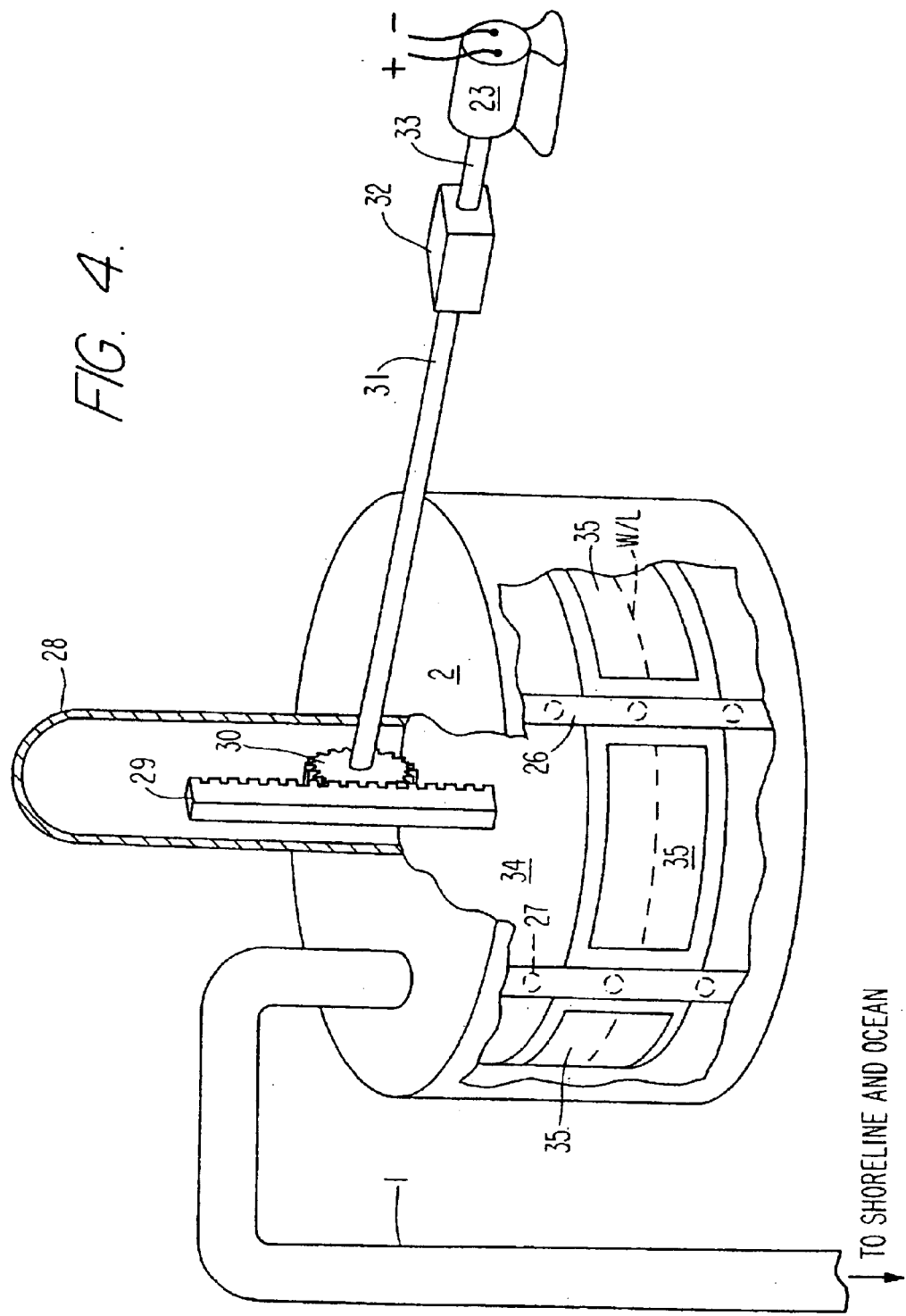
FIG. 4 is a side cross-sectional view of an offshore structure configured to convert offshore surface wave energy into fluctuating amounts of potential energy according to the invention.

In FIG. 4 pipe 1 opens into piston container 2 ashore and extension 28 which is closed on top. Pipe 1, container 2 and extension 28 form an enclosure which is full of water. Piston 34 within container 2 is hollow and has walls with windows 35 of a flexible material. There is some air within piston 34 for buoyancy. Piston 34 may be considered a Cartesian Diver. The height of container 2 is at least the sum of the tide range, possible height of ocean waves over the sunken end of pipe 1 and the height of piston 34. The height of container extension 28 is the same as container 2. The diameter of piston 34 is somewhat smaller than that of container 2. Rails 26 extend the height of container 2 and there are at least three rails 26 with rollers 27 located to center piston 34 within container 2. Affixed to piston 34 top plate is gear rack 29 which is enclosed by extension 28. Also in extension 28 is a pinion gear 30 which is located to mesh with rack 29 and is axially fixed to the wall of extension 28. Shaft 31 operably connects gear 30 and gearbox 32. Inside gearbox 32 is a gear mechanism able to convert the reciprocal movement of rack 29 into unidirectional motion of driveshaft 33. Shaft 31 is sealed through the wall of extension 28 so water does not leak out. Gearbox 32 is operably connected to drive generator 23 through shaft 33. Compression of seawater takes a great deal of weight per unit volume so the actual movement of cylinder 11 may only be a short distance. But wide fluctuations of pressure (from near zero absolute to a maximum depending on wave height) can be transmitted to shore where through the agency of Bourdon Tube 15 elastic potential energy may be converted into kinetic energy to operate induction generator 23.

A Cartesian Diver as in FIG. 4 can be used instead of the Bourdon Tube 15. Here again pressure energy in the form of elastic potential energy of the flexible material of windows 35 is converted into the kinetic energy of the Diver 34.

In operation Pressure fluctuations in pipe 1 cause piston 34 to move up and down operating the generator 23 through the agency of items 29,30,31,32 and 33. There is a little motion of the water through pipe 1 as the material in windows 35 is made to flex.

Second Preferred Embodiment.

Figure 1:
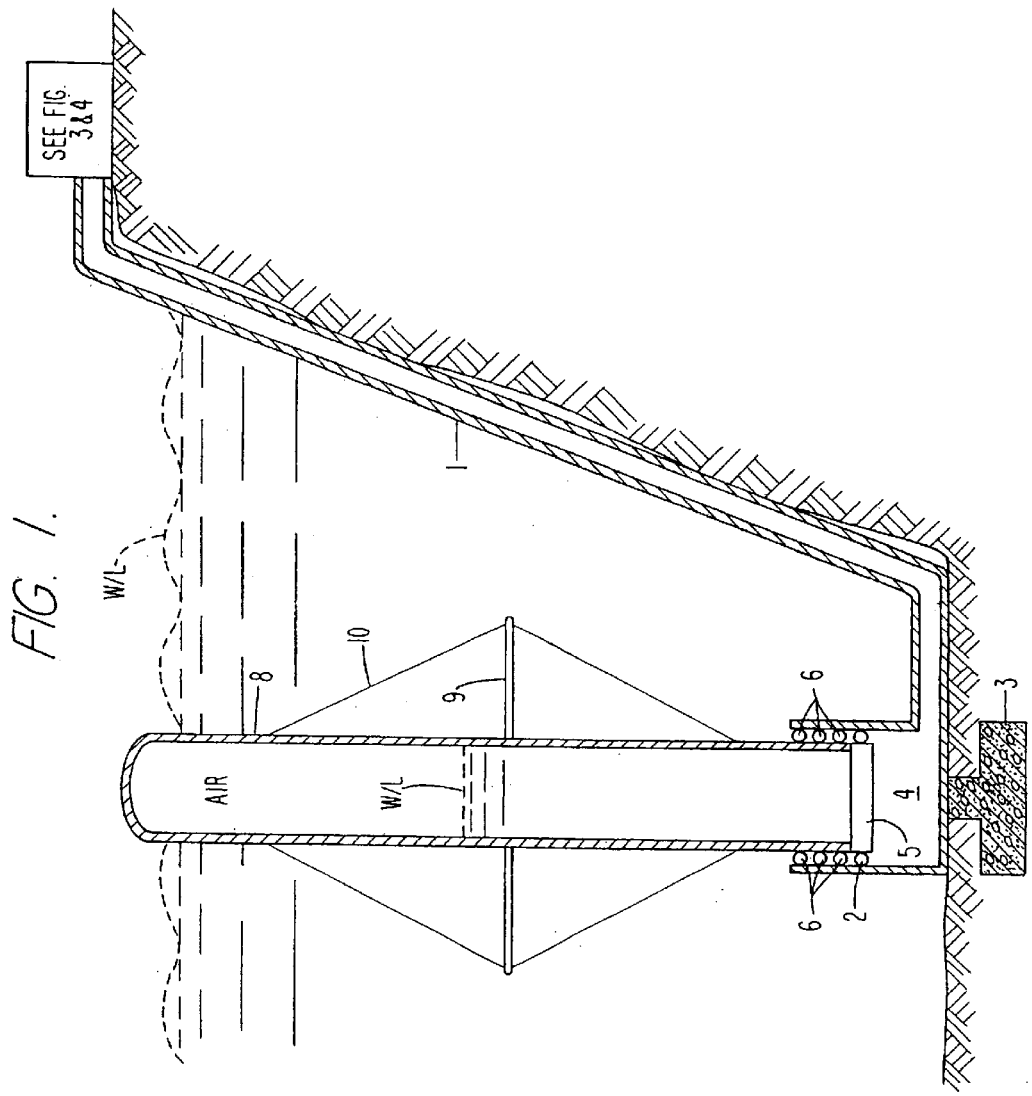
FIG. 1 is a perspective view showing how energy in the pipe may be converted into electrical energy using a Bourdon Tube.

This concerns the conversion of offshore surface wave energy into electrical energy. Turning to FIGS. 1,3 we see an offshore structure much like that of the first preferred embodiment. There is shown a base 3 firmly fixed to the ocean floor, anchoring piston sleeve 4 which contains piston 5 with attendant O-ring 2 between the rim of piston 5 and piston sleeve 4. Fixedly a attached to the top of piston 5 is cylinder 8 closed on top which is buoyant and weighted to float on the ocean's surface. Struts 9 are made to extend from the rigid wall of cylinder 8 horizontally and are stiffened by standing rigging 10 which is anchored to top and bottom portions of the vertical wall of cylinder 8 to stiffen the wall.

In operation, surface waves cause buoyant cylinder 8 to tend to move up and down. Moved downwards, pressure in pipe 1 is increased as piston 5 is made to tend to move downwards. If cylinder 8 is made to tend to move upwards pressure in pipe 1 is decreased. This reciprocal action operates electric generator ashore. Movement of cylinder 8 will be minimal. Only the weight on the water in pipe 1 is made to fluctuate.

The onshore energy conversion system may comprise the system shown in FIG. 4 rather than FIG. 3. A Cartesian Diver is used instead of a Bourdon Tube.

It will be noted that if the top of cylinder 8 is in the middle of the local tidal range then this invention will extract and convert tidal energy as if a wave with a twelve hour period were passing over cylinder 8. If this is desired cylinder 8 may have a very great diameter. For surface waves caused by the wind a great increase in diameter of cylinder 8 would be counterproductive.

From the above description it is apparent that the preferred embodiments achieve the objects of the present invention. Alternative embodiments and various modifications of the depicted embodiments will be apparent to those skilled in the relevant arts. These and other alternatives are considered to be equivalent and within the spirit and scope of the present invention.

What is claimed is:

1. A system for converting the kinetic energy of the ocean into electrical energy comprising:
    a. a force collecting means comprising a water-filled pipe with a first sunken end and which opens into a water-filled piston sleeve standing vertically on the bottom of said ocean, said piston sleeve containing a piston with a buoyant closed cylinder fixedly attached to said piston, said piston fitted with an O-ring around its rim so that in operation passing waves cause said piston and cylinder to tend to rise and fall, varying the potential energy of said water in said pipe, and
    b. an energy conversion means located ashore operatedly connected to a second end of said pipe, said energy conversion means selected from the group of (1) a Bourdon Tube, gear transmission means and an electric generator and (2) a Cartesian Diver, a gear transmission means and an electric generator, said generator configured to convert kinetic energy into electric energy.

2. The system of claim 1 wherein the top of said cylinder is located near the surface of said ocean.

3. The system of claim 1 wherein the top of said cylinder is located within an internal wave field of said ocean.

4. The system of claim 1 wherein the vertical walls of said cylinder comprise spars extended horizontally therefrom, said spars rigidized by rigging anchored to the walls of said cylinder so said walls are stiffened.

5. The system of claim 1 wherein said gear transmission means comprises a shaft operated by said force collection means in reciprocal motion and a second shaft operating said electrical generator in one direction.

6. The system of claim 1 wherein said energy conversion means comprises a Cartesian Diver within a closed container full of water, said Cartesian Diver having a portion of its walls made of flexible material and operably connected to said gear transmission means and said electric generator so as potential energy within said force collection means is made to vary, said Cartesian Diver is made to rise and fall, operating said gear transmission means which is thus made to operate said electric generator.

* * * * *